J. S. UNGER.
APPARATUS FOR SUPPLYING LIME TO AMMONIA STILLS.
APPLICATION FILED SEPT. 11, 1908.
994,431.
Patented June 6, 1911.
2 SHEETS—SHEET 2.
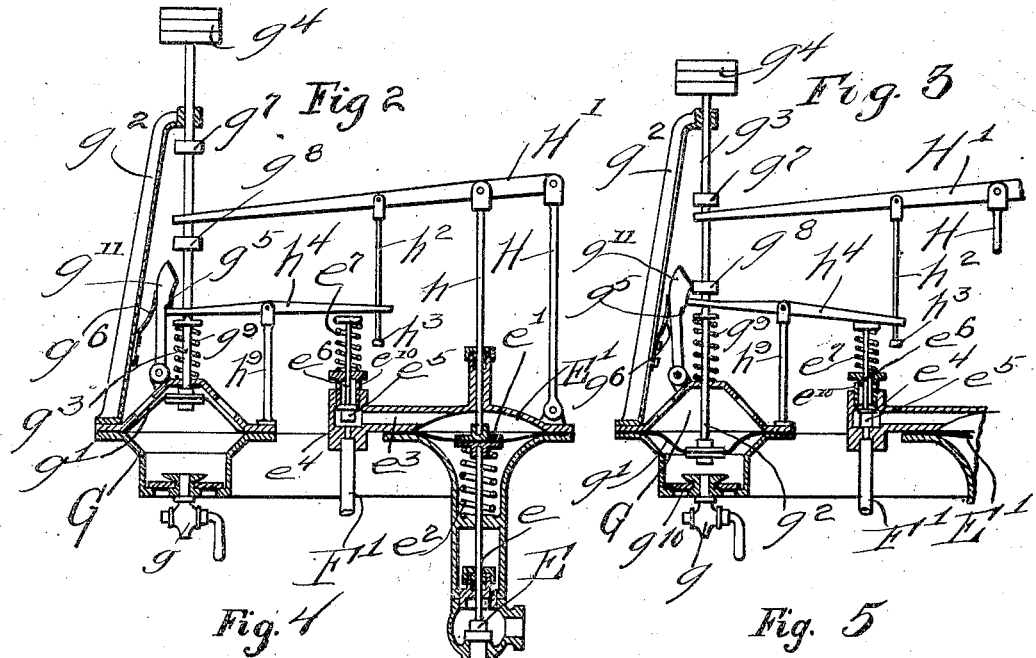
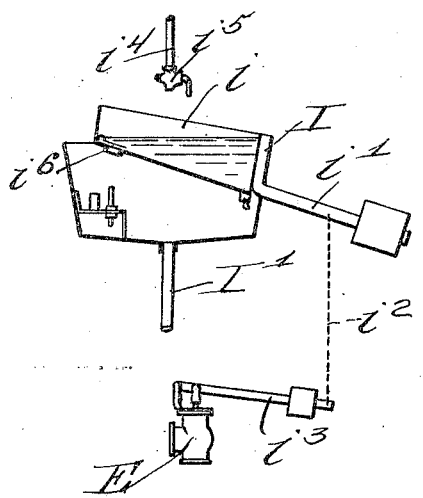
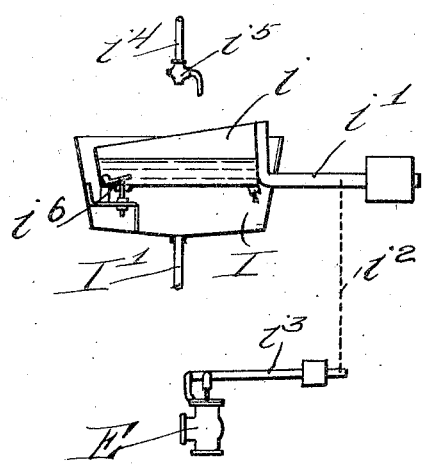
WITNESSES:
INVENTOR
John S. Unger.
BY
ATTORNEY

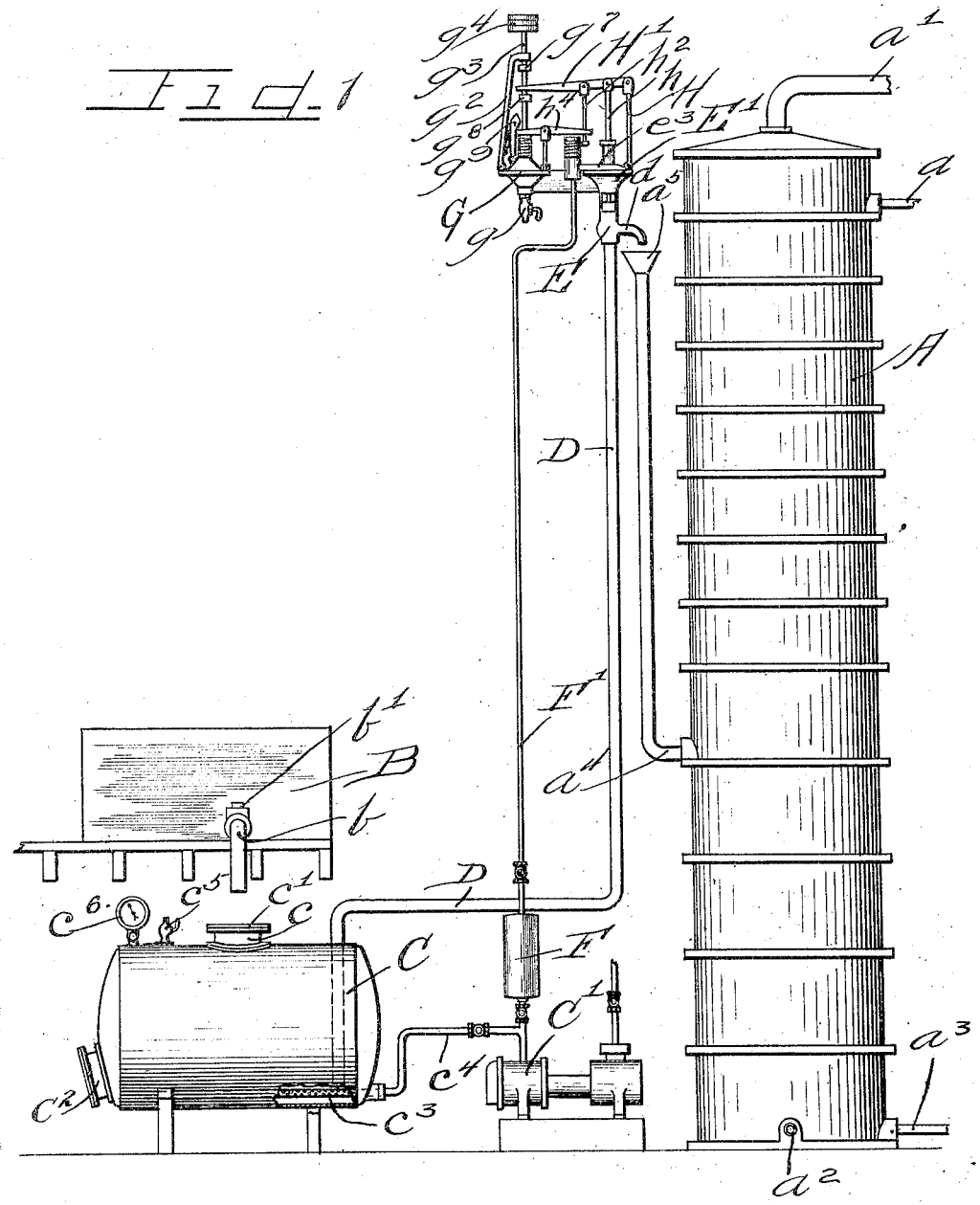

UNITED STATES PATENT OFFICE.

JOHN S. UNGER, OF CHICAGO, ILLINOIS.

APPARATUS FOR SUPPLYING LIME TO AMMONIA-STILLS.

994,431. Specification of Letters Patent. Patented June 6, 1911.

Application filed September 11, 1908. Serial No. 452,560.

*To all whom it may concern:*

Be it known that I, JOHN S. UNGER, a citizen of the United States, and a resident of the city of Chicago, in the county of Cook and State of Illinois, have invented certain new and useful Improvements in Apparatus for Supplying Lime to Ammonia-Stills; and I do hereby declare that the following is a full, clear, and exact description of the same, reference being had to the accompanying drawings, and to the letters of reference marked thereon, which form a part of this specification.

In the manufacture of ammonia from gas liquors, it has become the practice to introduce into the top of the ammonia still the gas liquor containing the ammonia and to also introduce therein the slaked lime to liberate the so-called "fixed" ammonia from its combinations with certain acids, and also to inject steam into the bottom of the still which serves to raise and maintain the temperature at the desired point to enable the reactions that are to take place to be most economically performed. As this process has been heretofore conducted and carried on, a solution of lime water has been continuously delivered to the still and to enable the flow to be continuous, the solution must of necessity be very thin, otherwise the lime would settle in the tank and receptacles and would clog the pipe and valves, and soon result in stoppage. Furthermore, to the extent that settling occurs, the proportion of lime contained in the solution or in suspension in the water is, of course, variable.

The object of this invention is to provide means for holding a comparatively thick solution of slaked lime and water in an agitated condition and forcing the same pneumatically to a height suitable to permit the same to discharge into the ammonia still at the desired point, and also to provide mechanism for automatically discharging the lime and water into the still in regulable amounts.

It is a further object of the invention to provide a mechanism for regulating and controlling the flow of the lime water whereby said material is automatically discharged into the still in the desired quantity and at the desired rate.

It is furthermore an object of the invention to afford in connection with a device of the class described apparatus for slaking the lime for delivering the same into the pressure tank and thence forcing the same to the required elevation and into the still.

The invention embraces many novel features and consists in the matters hereinafter described and more fully pointed out and defined in the appended claims.

In the drawings: Figure 1 is a side elevation of an ammonia still provided with mechanism embodying my invention for delivering slaked lime and water thereinto. Fig. 2 is an enlarged, vertical section of the timing valve G, controlling valve $e^5$, and discharging valve E, showing the valve E, closed. Fig. 3 is a similar view showing the timing valve $g^1$, at its lowest limit of movement and the controlling valve $e^5$, adjusted to release pressure from the discharge valve E. Fig. 4 is a detail of a slightly modified form of measuring or regulating device and showing the same ready to trip. Fig. 5 is a similar view showing the valve tripped or opened.

In the drawings: A, indicates the ammonia still, which may be of the usual or any preferred construction, and which, as shown, is provided at its top with a pipe $a$, to permit the inflow thereinto of the gas liquor containing the ammonia. Communicating in the top of the still centrally, and opening outwardly therefrom is a vapor pipe $a'$, and entering the still near its lower end is a steam pipe $a^2$. The waste pipe, (which also is located at the bottom of the still) is indicated by $a^3$.

Extending outwardly and upwardly from the side of the still is pipe $a^4$, adapted to receive the lime water and to deliver the same into the still in the path of the downwardly flowing gas liquors to mingle therein. At its upper end said pipe is provided with an enlarged end or funnel $a^5$, into which the flow of the lime and the water is directed.

Positioned conveniently to the still is an elevated slaking box or receptacle B, which is provided in one side thereof with a discharge pipe $b$, controlled by a valve $b^1$, whereby the slaked lime and water may be caused to flow therefrom. Positioned directly below the discharge pipe $b$, from the slaking box is a metallic tank or receptacle C, having connected in its top a hand hole (or man hole) fitting $c$, provided with a suitable cover $c^1$, which may be removed to permit the lime and water from the elevated receptacle B, to flow into the tank C. Said tank C, is also provided in one end with an aperture closed by a hand hole or man hole plate $C^2$, and which permits of access to the bottom of the tank to permit of readily cleansing the same to discharge therefrom the coarse sand, small stones or pebbles and the fragments of stone frequently contained in lime, and which were not sufficiently burned or of a proper nature to be converted into lime or to be broken up by slaking. Said mixing tank C, is provided in its bottom with an air pipe $c^3$, having perforations therein and operatively connected by means of a pipe $c^4$, with an air pump $C^1$, whereby air under pressure from said pump may be forced into the mixing tank continuously, thus keeping the contents of the tank in constant agitation and preventing the lime settling in the bottom of the tank and thus failing to deliver into the still. As shown, said pipe $c^4$, is valved to permit the same to be shut off entirely when it is desired to open the mixing tank for the addition of more lime water. As shown also, said mixing tank is provided with an air cock $c^5$, and a pressure gage $c^6$, by the use of which the pressure in the tank may be at all times regulated.

Communicating in the tank and extending from near the bottom thereof, is the lime discharge pipe D. This extends upwardly in close relation with the pipe $a^4$, and is provided at its upper end with a spout $d$, adapted to direct the discharge from said pipe into the funnel shaped end $a^5$, of the pipe $a^4$; and as shown, a valve is provided to regulate the flow of the lime and water through the pipe at all times and means are provided for automatically actuating the valve to control the flow therethrough to the still. For this purpose, the discharge valve E, is normally held seated to close the supply pipe D, and the closure thereof is provided with a stem $e$, which extends upwardly and is connected with a horizontal diaphragm $e^1$, in an enlarged chamber above the discharge valve and secured on the valve stem $e$, and bearing against the diaphragm $e^1$, is a strong pushing spring $e^2$, which exerts sufficient pressure to elevate the discharge valve under normal conditions. Connected in the top of the chamber $E^1$, containing the diaphragm $e^1$, of the valve, is a pipe $e^3$, which leads from the upper or outermost of said chambers in the casing $E^1$, and connects with a controlling valve $e^4$, which, in this instance, consists of a spring pressed closure $e^5$, the stem $e^6$, of which extends upwardly and is provided with a spiral spring $e^7$, which acts normally to hold the closure $e^5$, at all times elevated. As shown, a pressure chamber F, is suitably connected with the air chamber by means of valved pipes and connected in the top of said pressure chamber is a pipe $F^1$, which connects with the controlling valve chamber shown in Fig. 2. The spring $e^7$, on said controlling valve closure is to hold said closure elevated to permit the free flow of air from the pressure tank F, for the pump, upwardly and through said valve, and thence to the diaphragm in the casing $E^1$. Means are provided to reverse said controlling valve to cut off the pressure above the diaphragm $E^1$, and for this purpose a timing mechanism is provided, which, as shown, has a vent valve $g$, in the bottom of the casing G, and provided in said casing G, is a comparatively loose diaphragm $g^1$, to the center of which is connected a rod $g^3$, which extends through the wall of the casing and upwardly through a guide arm $g^2$, through which the upper end of the stem $g^3$, extends. As shown, a heavy weight $g^4$, is provided on the upper end of the stem and tends to normally hold the diaphragm near the lower limit of its travel. As shown also, a curved detent $g^{11}$, is pivotally engaged on the casing G, of the timing valve and is provided on its front side with a shoulder or tooth $g^5$, and at its rear side with a spring $g^6$, which serves to force said detent forwardly to the position shown in Fig. 2, to engage one end of a lever $h^4$, the other end of which extends over the top of, and in close proximity with the enlargement on the upper end of the stem $e^7$.

Pivoted on the side of the valve casing $E^1$, is an upwardly extending rod H, which at its upper end has pivotally engaged thereto the horizontal rod or bar $H^1$, with which is connected the stem $h$, for the diaphragm $e^1$, and also a downwardly extending stem or bar $h^2$, on the lower end of which is a button or enlargement $h^3$, adapted to engage and lift the end of said lever $h^4$, which is pivoted upon a supporting rod $h^5$, and the other end of which extends into position to be engaged by, and is engaged by the detent to hold said lever out of action. Also secured on the stem $g^3$, are collars $g^7$—$g^8$, one above and one below the end of said bar $H^1$.

The operation is as follows: Having filled or partly filled the mixing tank with the lime and water, a flow of air is injected into said tank to produce pressure and the air from the pipe $c^3$, serves to thoroughly agitate the liquid in the mixing tank to prevent any settling and thence the liquid holding the lime in solution is carried upwardly by the pressure through the pipe D, and the discharge valve E, if open, and is discharged to the pipe $a^4$, and the still. Normally the discharge valve E, is closed and is held closed by the pressure from the pipe $F^1$, the controlling valve $e^5$, of which is normally open, as shown in Fig. 2. The apparatus having been adjusted as shown in Fig. 2, the weight $g^4$, causes the diaphragm $g^1$, to descend, the air passing out through the vent valve $g$, the descent of the stem $g^3$, brings the collar $g^8$, into engagement with the inclined face of the detent $g^{11}$, retracting the same from the lever $h^4$, whereupon the spring $g^9$, throws the opposite end of said lever downwardly actuating the valve $e^5$, to close the pipe $F^1$, as shown in Fig. 3, and venting the diaphragm chamber $E^1$, by means of the apertures $e^{10}$ (see Fig. 3) permitting the spring $e^2$, to open the discharge valve E. Pressure from the pump $C^1$, now ejects lime and water from the tank C, through the pipe D, into the pipe $a^4$, from whence it flows to the still. The opening of the discharge valve E, lifts the lever $H^1$, and the stem $h$. The upward movement of said lever lifts the stem $g^3$, raising the diaphragm $g^1$, to the position shown in Fig. 2, this movement being made easier by the flap valve $g^{10}$, which permits ready inflow of air into the diaphragm chamber. The upward movement of the lever $H^1$, serves also to restore the lever $h^4$, into engagement with the detent $g^5$. For this purpose, a rod $h^2$, is secured on said lever $H^1$, and the end thereof is shaped to engage and lift the free end of the lever $h^4$, with the upward movement of the lever $H^1$. The controlling valve $e^5$, is now immediately opened by the spring $e^7$, thus opening the passage $e^3$ to the diaphragm chamber $E^1$, whereby the discharge valve E, is closed by compressed air admitted from pipe $F^1$, and the flow of lime and water is cut off.

Of course, the perfect control of the inlet valve $e^5$, by means of the timing mechanism enables the flow of the lime and water to be perfectly adjusted for either large or small plants, inasmuch as the intervals between discharges and the duration of the discharge can be perfectly controlled by adjustment of the vent valve $g$, which permits the air to quickly or slowly escape from the chamber and accordingly timing the movement of the valve $g$, weights $g^4$, and stem $g^3$, with the collars $g^7$ and $g^8$. If desired, another simple measuring or regulating device may be employed to automatically discharge into the still at a predetermined rate a quantity of lime and water. For this purpose, a tank or receptacle I, is set up conveniently to the still and the discharge pipe D, from the mixing tank is directed to the funnel shaped end of the pipe $a^4$, before described.

Pivotally supported in the tank I, is a pan $i$, provided with an outwardly directed weighted lever $i^1$, which is physically connected by means of a chain $i^2$, with the end of the lever $i^3$, which controls the valve E. Said pan $i$, is provided at its end remote from the pivot with a removable bottom section or valve $i^6$, which, when the receptacle tilts downwardly, as shown in Fig. 5, serves to discharge the contents, causing the levers $i^1$, to rise and lifting the lever $i^3$, of the discharge valve. Immediately after the pan $i$, has dumped its contents it returns to normal position to again collect water from the valved pipe $i^4$, and slowly descending, discharges the water or other suitable fluid through its valve $i^6$, and discharge pipe $I^1$, thus successively opening and closing the discharge valve E, the rate of action, of course, depending on the flow through the cock $i^5$, and whereby the discharge of water may be perfectly regulated to time the dumping of the tank and the consequent opening of the main discharge valve.

Owing to the action of the valve $c^5$, the air is continuously delivered through the pipe $c^3$, constantly agitating the mixture. Any suitable type of valve may be used for this purpose—from a simple cock, which may be left partly open—to any type of automatic safety valve, whereby the pressure may be regulated and the flow continued through the mixture.

Of course, I am aware that many details of the construction may be varied. I therefore do not purpose limiting this application for patent otherwise than necessitated by the prior art.

I claim as my invention:

1. In a device of the class described the combination with an ammonia still of a mixing tank connected to discharge lime and water in solution to the still, pneumatic means for agitating the lime and water and elevating the same for admission to the still and valves so disposed as to control the flow to the still and to automatically open and shut the discharge valve to regulate the quantity of material delivered to the still.

2. In a device of the class described an ammonia still, a pressure tank for receiving material, means affording communication between the pressure tank and still, means for supplying pressure in the pressure tank to force the material therein into the still, a valve for controlling the discharge of material from the tank to the ammonia still and means for intermittently opening the valve whereby the pressure forces a suitable quantity of material into the still.

3. In a device of the class described an ammonia still, a pressure tank adapted to contain material, means for supplying pressure in the tank for thoroughly mixing the material and means for intermittently affording communication between the pressure tank and ammonia still to intermittently admit a quantity of material from the tank to the still.

4. In a device of the class described an ammonia still, a pressure tank adapted to contain material, means for supplying pressure in the tank for thoroughly mixing the material, means for intermittently affording communication between the pressure tank and ammonia still to intermittently admit a quantity of material from the tank to the still, and means for regulating the rate of operation of the intermittent means.

5. In a device of the class described, a pressure tank adapted to contain material, means for forcing the material from the tank, an automatically operating discharge valve for admitting the material from the tank, an automatically acting controlling valve for controlling the operation of the discharge valve and a timing valve for regulating the rate of action of the controlling and the discharge valves.

6. In a device of the class described an ammonia still, a tank for receiving lime water, means affording communication between the same and still, means for delivering pneumatic pressure into the tank for forcing the lime water into the still and means for interrupting the delivery of lime water to the still to deliver predetermined quantities to the still at the proper time.

7. The combination with a receptacle for slaking lime, a pressure tank adapted to receive the slaked lime, an ammonia still and pneumatic means for both thoroughly mixing the slaked lime and forcing the same into the still.

8. In a device of the class described an ammonia still, a lime receptacle, a pipe adapted to deliver into the still, a valve in the pipe, means for supplying compressed air to agitate the lime in the tank, and means for admitting compressed air to operate the valve to close the pipe and for cutting off the compressed air adapting the valve to open the pipe.

9. In a device of the class described an ammonia still, a lime receptacle, a pipe adapted to deliver into the still, a valve in the pipe, means for supplying compressed air to agitate the lime in the tank, means for admitting compressed air to operate the valve to close the pipe and for cutting off the compressed air adapting the valve to open the pipe, and means for regulating the length of time the valve is closed and open.

10. In a device of the class described an ammonia still, a pressure tank for containing lime water, a pipe opening into the side of the still, a discharge pipe opening from the pressure tank adapted to discharge into the first named pipe, a valve for controlling the discharge pipe and mechanism for delivering pressure to agitate the lime water in the tank to force the same through the discharge tank and to operate the valve.

In testimony whereof I have hereunto subscribed my name in the presence of two subscribing witnesses.

JOHN S. UNGER.

Witnesses:
  H. E. HANNAH,
  LAWRENCE REIBSTEIN.